United States Patent
Lim et al.

(10) Patent No.: US 9,325,000 B2
(45) Date of Patent: Apr. 26, 2016

(54) CATHODE ACTIVE MATERIAL AND THE SECONDARY BATTERY COMPRISING THE SAME

(71) Applicant: LG CHEM, LTD., Seoul (KR)

(72) Inventors: SooHyun Lim, Daejeon (KR); Jae Hyun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/865,605

(22) Filed: Apr. 18, 2013

(65) Prior Publication Data

US 2013/0302681 A1 Nov. 14, 2013

(30) Foreign Application Priority Data

Apr. 18, 2012 (KR) .................. 10-2012-0040302

(51) Int. Cl.
*H01M 4/90* (2006.01)
*H01M 4/36* (2006.01)
*H01M 4/60* (2006.01)
*H01M 4/505* (2010.01)
*H01M 4/525* (2010.01)
*H01M 10/42* (2006.01)

(52) U.S. Cl.
CPC .............. *H01M 4/366* (2013.01); *H01M 4/505* (2013.01); *H01M 4/525* (2013.01); *H01M 4/602* (2013.01); *H01M 10/4235* (2013.01); *Y02E 60/122* (2013.01)

(58) Field of Classification Search
USPC ................................................. 429/527, 528
See application file for complete search history.

(56) References Cited

U.S. PATENT DOCUMENTS

| | | | | |
|---|---|---|---|---|
| 2004/0106039 A1* | 6/2004 | Arai et al. | ...................... | 429/199 |
| 2010/0316904 A1* | 12/2010 | Zhang | ............................ | 429/163 |
| 2011/0171539 A1* | 7/2011 | Patoux et al. | .................. | 429/341 |
| 2013/0054061 A1* | 2/2013 | Nishimoto | .......... | H01M 2/1653 701/22 |
| 2013/0095382 A1* | 4/2013 | Kim et al. | ..................... | 429/211 |

FOREIGN PATENT DOCUMENTS

| JP | 2000-133272 | 5/2000 |
|---|---|---|
| KR | 10-2008-0015161 A | 2/2008 |

* cited by examiner

*Primary Examiner* — Mark F Huff
*Assistant Examiner* — Monique Wills
(74) *Attorney, Agent, or Firm* — Birch, Stewart, Kolasch & Birch, LLP

(57) ABSTRACT

Disclosed is a cathode active material comprising a lithium nickel manganese composite oxide with a spinel structure represented by the following Formula 1, wherein the cathode active material is surface-coated with a silane compound and a silicon content of the silane compound is 0.01 to 5% by weight, based on the total amount of the cathode active material:

$$Li_xM_yMn_{2-y}O_{4-z}A_z \qquad (1)$$

wherein $0.9 \leq x \leq 1.2$, $0 < y < 2$, and $0 \leq z < 0.2$;
M is at least one element selected from the group consisting of Al, Mg, Ni, Co, Fe, Cr, V, Ti, Cu, B, Ca, Zn, Zr, Nb, Mo, Sr, Sb, W, Ti and Bi; and
A is at least one monovalent or bivalent anion.
Disclosed is also a secondary battery comprising the same.

15 Claims, 2 Drawing Sheets

CATHODE ACTIVE MATERIAL AND THE SECONDARY BATTERY COMPRISING THE SAME

TECHNICAL FIELD

The present invention relates to a cathode active material and a secondary battery comprising the same. More specifically, the present invention relates to a cathode active material comprising a lithium nickel manganese composite oxide with a spinel structure represented by the following Formula 1, wherein the cathode active material is surface-coated with a silane compound and a silicon content of the silane compound is 0.01 to 5% by weight, based on the total amount of the cathode active material, and a secondary battery comprising the same:

$$Li_xM_yMn_{2-y}O_{4-z}A_z \quad (1)$$

wherein 0.9≤x≤1.2, 0<y<2, and 0≤z<0.2;

M is at least one element selected from the group consisting of Al, Mg, Ni, Co, Fe, Cr, V, Ti, Cu, B, Ca, Zn, Zr, Nb, Mo, Sr, Sb, W, Ti and Bi; and A is at least one monovalent or bivalent anion.

BACKGROUND ART

Advances in technology and increasing demand associated with mobile equipment have led to a sharp increase in demand for secondary batteries as energy sources. Among these secondary batteries, lithium secondary batteries having high energy density and operating voltage, long lifespan and low self-discharge are commercially available and widely used.

In addition, in recent years, increased interest in environmental issues has brought about a great deal of research associated with electric vehicles (EVs) and hybrid electric vehicles (HEVs) as alternatives to vehicles using fossil fuels such as gasoline vehicles and diesel vehicles which are major causes of air pollution. Nickel metal hydride (Ni-MH) secondary batteries are generally used as power sources of electric vehicles (EVs), hybrid electric vehicles (HEVs) and the like. However, research associated with use of lithium secondary batteries having high energy density, high discharge voltage and power stability is actively underway and some of such lithium secondary batteries are commercially available.

A lithium secondary battery has a structure in which a non-aqueous electrolyte comprising a lithium salt is impregnated into an electrode assembly comprising a cathode and an anode, each comprising an active material coated on a current collector, and a porous separator interposed therebetween.

Lithium transition metal oxides such as lithium cobalt-based oxides or lithium nickel-based oxides are commonly used for a cathode for lithium secondary batteries. Use of lithium metal oxide having a spinel structure such as $LiN_{i_x}Mn_{2-x}O_4$ (in which x is 0.01 to 0.6) which has a mean voltage of 4.7V and is used in high-voltage batteries is considered.

However, the lithium metal oxide having a spinel structure has a high voltage. In this case, the lithium metal oxide reaches an oxidation potential of an electrolyte, thus leading to oxidation of the electrolyte and thus generation of by-products and deteriorating secondary batteries.

Accordingly, there is an increasing need for methods capable of solving these problems.

DISCLOSURE

Technical Problem

Therefore, the present invention has been made to solve the above and other technical problems that have yet to be resolved.

As a result of a variety of extensive and intensive studies and experiments, the present inventors discovered that desired effects could be obtained by using a cathode active material comprising a lithium nickel manganese composite oxide with a spinel structure which is surface-coated with a predetermined amount of silane compound. The present invention has been completed, based on this discovery.

Technical Solution

In accordance with one aspect of the present invention, provided is a cathode active material comprising a lithium nickel manganese composite oxide represented by the following Formula 1, wherein the cathode active material is surface-coated with a silane compound and a silicon content of the silane compound is 0.01 to 5% by weight, based on the total amount of the cathode active material:

$$Li_xM_yMn_{2-y}O_{4-z}A_z \quad (1)$$

wherein 0.9≤x≤1.2, 0<y<2, and 0≤z<0.2;

M is at least one element selected from the group consisting of Al, Mg, Ni, Co, Fe, Cr, V, Ti, Cu, B, Ca, Zn, Zr, Nb, Mo, Sr, Sb, W, Ti and Bi; and A is at least one monovalent or bivalent anion.

As described above, decomposition of an electrolyte is accelerated by side reaction between the cathode active material and the electrolyte, and gas is thus generated. Such gas causes safety issues in the secondary battery, for example, swelling or explosion thereof.

Accordingly, the cathode active material according to the present invention comprises a silane compound coated on the surface thereof, thereby solving these problems.

In one embodiment, the silane compound may be represented by the following Formula a:

$$R_1—Si(R_2)(R_3)—R_4 \quad (a)$$

wherein one or more of $R_1$, $R_2$, $R_3$ and $R_4$ are each independently hydrogen, a halogen, alkylamino, dialkylamino, alkyl alcohol, $C_1$-$C_{20}$ alkyl, $C_1$-$C_{20}$ alkenyl, $C_1$-$C_{20}$ alkynyl, $C_1$-$C_{20}$ alkoxy, $C_1$-$C_{20}$ alkoxy carbonyl, $C_1$-$C_{20}$ acyl, $C_3$-$C_{20}$ cycloalkyl, $C_6$-$C_{18}$ aryl, $C_2$-$C_{18}$ allyl, nitrile, silazane or phosphate.

More specifically, in the silane compound of Formula a, one or more of $R_1$ to $R_3$ may be a halogen, silazane, $C_1$-$C_{20}$ alkoxy, $C_6$-$C_{18}$ aryl, or $C_2$-$C_{18}$ allyl, and $R_4$ is $C_1$-$C_{20}$ alkyl, nitrile, fluorine or phosphate, and more specifically, $R_1$ and $R_2$ are a halogen, silazane, $C_1$-$C_{20}$ alkoxy, $C_6$-$C_{18}$ aryl or $C_2$-$C_{18}$ allyl, and $R_3$ and $R_4$ are $C_1$-$C_{20}$ alkyl, nitrile, fluorine or phosphate.

In another embodiment, the silane compound of Formula a, one or more of $R_1$ to $R_3$ are $C_1$-$C_{20}$ alkyl or $C_1$-$C_{20}$ alkoxy, and $R_4$ is silazane.

The silazane defined above refers to all compounds having a Si—Ni—Si bond and may be referred to as disilazane or trisilazane, depending on the number of silicon atoms. Alkylamino, dialkylamino, alkyl, alkenyl, alkynyl, alkoxy, alkoxy carbonyl, acyl, cycloalkyl, aryl and the like as defined above are well known in the art and a detailed definition thereof is thus omitted.

Specifically, the silane compound of Formula a may be hexamethyldisilazane represented by $(Si(CH_3)_3)_2NH$.

More specifically, a silicon content of the cathode active material coated with the silane compound is 0.01 to 3% by weight, based on the total weight of the cathode active material. When the content of silicon is excessively low, the effect of preventing electrolyte oxidation by formation of the coating layer cannot be obtained, and when the content of silicon is excessively high, the coating layer becomes excessively thick, internal resistance greatly increases, and battery performance may be deteriorated.

The coating layer may be any method wherein a predetermined material is applied to the surface of an active material, as is well known in the art. For example, application may be carried out in a dry or wet manner.

In the present invention, the lithium metal oxide may be represented by the following Formula 2:

$$Li_xNi_yMn_{2-y}O_4 \quad (2)$$

wherein $0.95 \leq x \leq 1.2$, and $0.4 \leq y \leq 0.5$.

The lithium metal oxide may be $LiNi_{0.5}Mn_{1.5}O_4$ or $LiNi_{0.4}Mn_{1.6}O_4$.

The present invention provides a secondary battery comprising the cathode active material.

For example, the secondary battery according to the present invention comprises a cathode produced by applying a mixture containing a cathode active material, a conductive material and a binder to a cathode current collector, followed by drying and pressing, and an anode produced by the same method as the cathode. In this case, the mixture may further comprise a filler, as necessary.

The cathode current collector is generally fabricated to have a thickness of 3 to 500 µm. There is no particular limit as to the cathode current collector, so long as it has suitable conductivity without causing adverse chemical changes in the fabricated battery. Examples of the cathode current collector include stainless steel, aluminum, nickel, titanium, sintered carbon, and aluminum or stainless steel surface-treated with carbon, nickel, titanium or silver. If necessary, these current collectors may be processed to form fine irregularities on the surface thereof so as to enhance adhesion to the cathode active materials. In addition, the current collectors may be used in various forms including films, sheets, foils, nets, porous structures, foams and non-woven fabrics.

In addition to the compound defined above, the cathode active material may further comprise a compound selected from: layered compounds such as lithium cobalt oxide ($LiCoO_2$) and lithium nickel oxide ($LiNiO_2$) or these compounds substituted by one or more transition metals; lithium manganese oxides represented by $Li_{1+x}Mn_{2-x}O_4$ (in which $0<x<0.33$), $LiMnO_3$, $LiMn_2O_3$ and $LiMnO_2$; lithium copper oxide ($Li_2CuO_2$); vanadium oxides such as $LiV_3O_8$, $LiFe_3O_4$, $V_2O_5$ and $Cu_2V_2O_7$; Ni-site type lithiated nickel oxides represented by $LiNi_{1-x}M_xO_2$ (M=Co, Mn, Al, Cu, Fe, Mg, B or Ga, and $0.01<x<0.3$); lithium manganese composite oxides represented by $LiMn_{2-x}M_xO_2$ (M=Co, Ni, Fe, Cr, Zn or Ta, and $0.01 \leq x \leq 0.1$), or $Li_2Mn_3MO_8$ (M=Fe, Co, Ni, Cu or Zn); $LiMn_2O_4$ wherein a part of Li is substituted by an alkaline earth metal ion; disulfide compounds; and $Fe_2(MoO_4)_3$. This compound may be present in an amount of 1 to 30% by weight, based on the total weight of the cathode active material.

The conductive material is commonly added in an amount of 1 to 50% by weight, based on the total weight of the mixture comprising the cathode active material. Any conductive material may be used without particular limitation so long as it has suitable conductivity without causing adverse chemical changes in the battery. Examples of such conductive materials include: graphite such as natural graphite or artificial graphite; carbon black such as carbon black, acetylene black, Ketjen black, channel black, furnace black, lamp black and thermal black; conductive fibers such as carbon fibers and metallic fibers; metallic powders such as carbon fluoride powders, aluminum powders and nickel powders; conductive whiskers such as zinc oxide and potassium titanate; conductive metal oxides such as titanium oxide; and conductive materials such as polyphenylene derivatives.

The binder is a component enhancing binding of an electrode active material to the conductive material and the current collector. The binder is commonly added in an amount of 1 to 50% by weight, based on the total weight of the mixture comprising the cathode active material. Examples of the binder include polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene propylene diene terpolymer (EPDM), sulfonated EPDM, styrene butadiene rubbers, fluororubbers and various copolymers.

The filler is a component optionally used to inhibit expansion of the electrode. Any filler may be used without particular limitation so long as it does not cause adverse chemical changes in the manufactured battery and is a fibrous material. Examples of the filler include olefin polymers such as polyethylene and polypropylene; and fibrous materials such as glass fibers and carbon fibers.

The anode current collector is generally fabricated to have a thickness of 3 to 500 µm. There is no particular limit as to the anode current collector, so long as it has suitable conductivity without causing adverse chemical changes in the fabricated battery. Examples of the anode current collector include copper, stainless steel, aluminum, nickel, titanium, sintered carbon, and copper or stainless steel surface-treated with carbon, nickel, titanium or silver, and aluminum-cadmium alloys. Similar to the cathode current collector, the anode current collector may be processed to form fine irregularities on the surface thereof so as to enhance adhesion to the anode active material. In addition, the current collectors may be used in various forms including films, sheets, foils, nets, porous structures, foams and non-woven fabrics.

Examples of the anode active material include, but are not limited to, carbon such as non-graphitized carbon and graphitized carbon; metal composite oxides such as $Li_xFe_2O_3$ ($0 \leq x \leq 1$), $Li_xWO_2$ ($0 \leq x \leq 1$) and $Sn_xMe_{1-x}Me'_yO_x$ (Me:Mn, Fe, Pb, Ge; Me':Al, B, P, Si, Group I, II and III elements of the Periodic Table, halogen atoms; $0<x\leq1$; $1\leq y\leq3$; and $1\leq z\leq8$); lithium metal; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni based materials. Specifically, the lithium metal oxide represented by the following Formula 3 may be used.

$$Li_aM'_bO_{4-c}A_c \quad (3)$$

wherein M' is at least one element selected from the group consisting of Ti, Sn, Cu, Pb, Sb, Zn, Fe, In, Al and Zr;

a and b are determined according to an oxidation number of M' within ranges of $0.1 \leq a \leq 4$ and $0.2 \leq b \leq 4$;

c is determined according to an oxidation number within a range of $0 \leq c < 0.2$; and A is at least one monovalent or bivalent anion.

The oxide of Formula 3 is represented by the following Formula 4:

$$Li_aTi_bO_4 \quad (4)$$

wherein $0.1 \leq a \leq 4$ and $0.2 \leq b \leq 4$.

The lithium metal oxide may be $Li_{1.33}Ti_{1.67}O_4$ or $LiTi_2O_4$.

For example, lithium titanium oxide (LTO) may be used as the anode active material since it has an electrical conductivity per se. In this case, a spinel-lithium manganese composite oxide represented by $LiNi_xMn_{2-x}O_4$ (x=0.01 to 0.6) which has a relatively high potential due to high potential of LTO may be used as the cathode active material.

The secondary battery may be a lithium secondary battery in which a lithium salt-containing electrolyte is impregnated into an electrode assembly having a structure in which a separator is interposed between a cathode and an anode.

The separator is interposed between the cathode and the anode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and the electrolyte.

The lithium salt-containing, non-aqueous electrolyte is composed of an electrolyte and a lithium salt. Examples of the electrolyte include, but are not limited to, a non-aqueous organic solvent, an organic solid electrolyte and an inorganic solid electrolyte.

Examples of the non-aqueous organic solvent include non-protic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ethers, methyl propionate and ethyl propionate.

Examples of the organic solid electrolyte include polyethylene derivatives, polyethylene oxide derivatives, polypropylene oxide derivatives, phosphoric acid ester polymers, polyagitation lysine, polyester sulfide, polyvinyl alcohols, polyvinylidene fluoride, and polymers containing ionic dissociation groups.

Examples of the inorganic solid electrolyte include nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and examples thereof include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imides.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further contain halogen-containing solvents such as carbon tetrachloride and ethylene trifluoride. Further, in order to improve high-temperature storage characteristics, the non-aqueous electrolyte may further contain carbon dioxide gas or the like and may further contain fluoro-ethylene carbonate (FEC), propene sulfone (PRS) and the like.

For example, the lithium salt-containing non-aqueous electrolyte can be prepared by adding a lithium salt such as $LiPF_6$, $LiClO_4$, $LiBF_4$ and $LiN(SO_2CF_3)_2$, to a mixed solvent of a cyclic carbonate such as EC or PC as a highly dielectric solvent and a linear carbonate such as DEC, DMC or EMC as a low-viscosity solvent.

The present invention provides a battery module comprising the secondary battery as a unit battery and a battery pack comprising the battery module.

The battery pack may be used as a power source for medium to large devices requiring high-temperature stability, long cycle properties and high rate properties.

Preferably, examples of the medium to large devices include, but are not limited to, power tools powered by battery-driven motors; electric vehicles including electric vehicles (EVs), hybrid electric vehicles (HEVs) and plug-in hybrid electric vehicles (PHEVs); electric two-wheeled vehicles including electric bikes (E-bikes) and electric scooters (E-scooters); electric golf carts; power storage systems and the like.

Effects of the Invention

As apparent from the foregoing, the cathode active material according to the present invention comprises a lithium nickel manganese composite oxide having a spinel structure which is coated with a silane compound to a predetermined thickness, thus preventing generation of gas and by-products caused by electrolyte oxidation during charge and discharge of batteries. Accordingly, a secondary battery comprising the cathode active material exerts superior safety and lifespan.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Now, the present invention will be described in more detail with reference to the following examples. These examples are provided only to illustrate the present invention and should not be construed as limiting the scope and spirit of the present invention.

EXAMPLE 1

A cathode active material was prepared by coating the surface of $LiNi_{0.5}Mn_{1.5}O_4$ with hexamethyldisilazane such that a content of silicon present on the surface of $LiNi_{0.5}Mn_{1.5}O_4$ was 0.05% by weight, with respect to the total amount of the cathode active material.

Comparative Example 1

A cathode active material comprising $LiNi_{0.5}Mn_{1.5}O_4$ not coated with a silane compound was prepared.

Experimental Example 1

95% by weight of each of cathode active materials prepared in Example 1 and Comparative Example 1, 5% by weight of Super-C (conductive material) and 5% by weight of PVdF (binder) were added to NMP to prepare a cathode mix, and the cathode mix was applied to an aluminum current collector, followed by drying and pressing, to produce a cathode. 90% by weight of $Li_{1.33}Ti_{1.67}O_4$, 5% by weight of Super-C (conductive material) and 5% by weight of PVdF (binder) were added to NMP to prepare an anode mix and the anode mix was applied to an aluminum current collector, followed by drying and pressing, to produce an anode. An electrode assembly was produced by inserting a porous separator made of polypropylene between the cathode and the anode. Then, the electrode assembly was inserted into a pouch, a lead line was connected thereto, a solution of 1M $LiPF_6$ in a mixed solvent consisting of ethylene carbonate (EC), dimethyl carbonate (DMC) and ethyl methyl carbonate (EMC) at a volume ratio of 1:1:1 was injected as an electrolyte and sealed to assemble a lithium secondary battery. The secondary battery was stored at 55° C. for four weeks upon charge/discharge and gas generation amounts were measured. The amounts are shown in FIG. 1.

Figure 1:
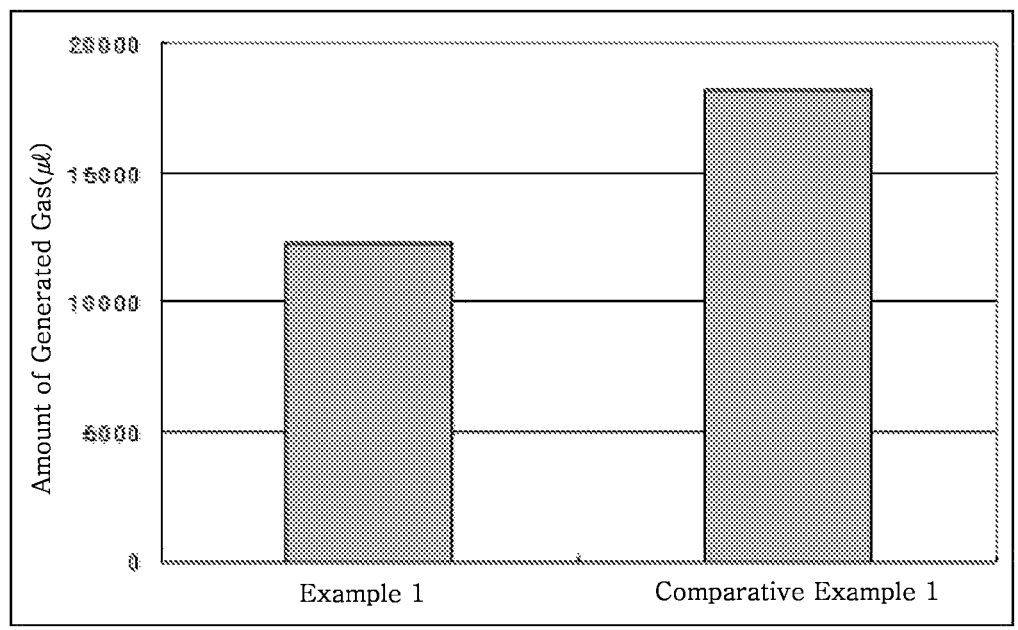
FIG. 1 is a graph showing an amount of gas generated during charge and discharge of a secondary battery according to Experimental Example 1.

As can be seen from FIG. 1, the battery of Example 1 exhibited superior safety due to reduced gas generation, as compared to the battery of Comparative Example 1 not comprising a silane compound.

Experimental Example 2

A relative capacity of the lithium secondary battery produced by the method of Experimental Example 1 was measured under 1C/1C charge and discharge conditions with respect to charge cycles. The relative capacity is shown in FIG. 2.

Figure 2:
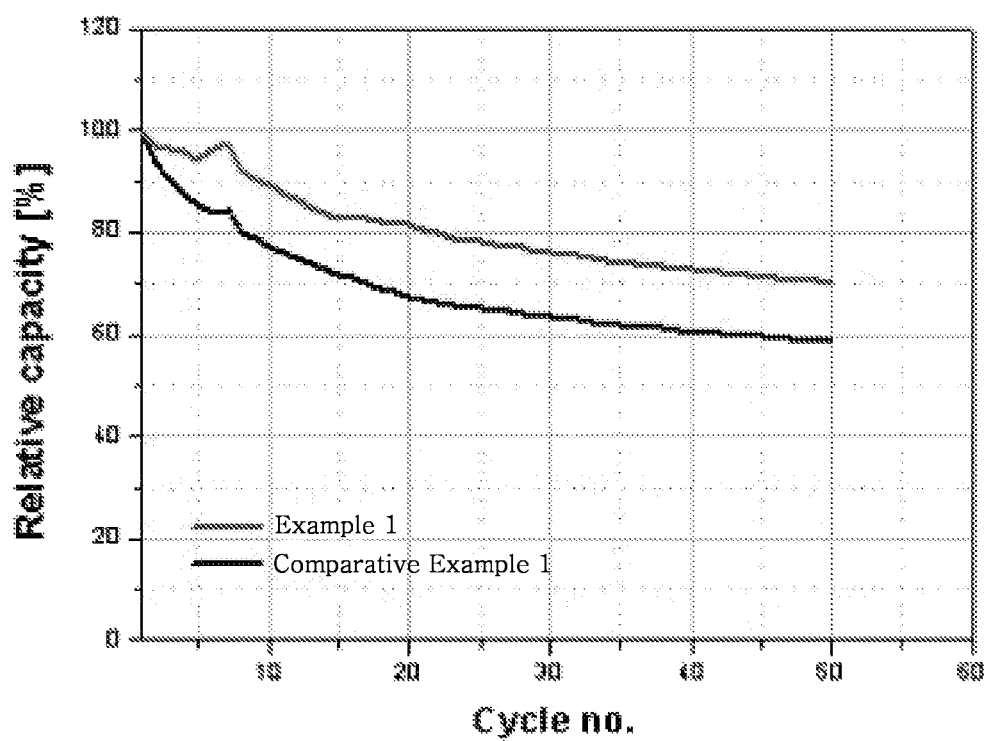
FIG. 2 is a graph showing lifespan of a secondary battery according to Experimental Example 2 with respect to the number of cycles.

As can be seen from FIG. 2, the battery of Example 1 exhibited little capacity decrease with respect to the number of cycles and thus superior lifespan, as compared to the battery of Comparative Example 1 not comprising a silane compound.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A cathode active material comprising a lithium nickel manganese composite oxide with a spinel structure represented by the following Formula 1 which is suitable for use in high-voltage batteries having a mean voltage of 4.7V, wherein the cathode active material is surface-coated with a silane compound, and a silicon content of the silane compound is 0.01 to 5% by weight, based on the total amount of the cathode active material:

wherein 0.9≤x≤1.2, 0<y<2, and 0≤z<0.2;

M is at least one element selected from the group consisting of Al, Mg, Ni, Co, Fe, Cr, Ti, Cu, B, Ca, Zn, Zr, Nb, Mo, Sr, Sb, W, Ti and Bi; and A is at least one monovalent or bivalent anion.

2. The cathode active material according to claim 1, wherein the silane compound is represented by the following Formula a:

wherein one or more of $R_1$, $R_2$, $R_3$ and $R_4$ are each independently hydrogen, a halogen, alkylamino, dialkylamino, alkyl alcohol, $C_1$-$C_{20}$ alkyl, $C_1$-$C_{20}$ alkenyl, $C_1$-$C_{20}$ alkynyl, $C_1$-$C_{20}$ alkoxy, $C_1$-$C_{20}$ alkoxy carbonyl, $C_1$-$C_{20}$ acyl, $C_3$-$C_{20}$ cycloalkyl, $C_6$-$C_{18}$ aryl, $C_2$-$C_{18}$ allyl, nitrile, silazane or phosphate.

3. The cathode active material according to claim 2, wherein, in the silane compound of Formula a, one or more of $R_1$ to $R_3$ are a halogen, silazane, $C_1$-$C_{20}$ alkoxy, $C_6$-$C_{18}$ aryl, or $C_2$-$C_{18}$ allyl, and $R_4$ is $C_1$-$C_{20}$ alkyl, nitrile, fluorine or phosphate.

4. The cathode active material according to claim 2, wherein, in the silane compound of Formula a, $R_1$ and $R_2$ are a halogen, silazane or $C_1$-$C_{10}$ alkoxy, $C_6$-$C_{18}$ aryl, or $C_2$-$C_{18}$ allyl, and $R_3$ and $R_4$ are $C_1$-$C_{20}$ alkyl, nitrile, fluorine or phosphate.

5. The cathode active material according to claim 2, wherein, in the silane compound of Formula a, one or more of $R_1$ to $R_3$ are $C_1$-$C_{20}$ alkyl or $C_1$-$C_{20}$ alkoxy, and $R_4$ is silazane.

6. The cathode active material according to claim 5, wherein the silane compound of Formula a is hexamethyldisilazane.

7. The cathode active material according to claim 1, wherein a silicon content of the silane compound is 0.01 to 3% by weight with respect to the total weight of the cathode active material.

8. The cathode active material according to claim 1, wherein the lithium metal oxide is represented by the following Formula 2:

wherein 0.9≤x≤1.2, and 0.4≤y≤0.5.

9. The cathode active material according to claim 8, wherein the lithium metal oxide is $LiNi_{0.5}Mn_{1.5}O_4$ or $LiNi_{0.4}Mn_{1.6}O_4$.

10. A secondary battery comprising the cathode active material according to claim 1, wherein said secondary battery is suitable for use in high-voltage batteries having a mean voltage of 4.7V.

11. The secondary battery according to claim 10, wherein the secondary battery is a lithium secondary battery.

12. A battery module comprising the secondary battery according to claim 10 as a unit battery.

13. A battery pack comprising the battery module according to claim 12.

14. A device comprising the battery pack according to claim 13.

15. The device according to claim 14, wherein the device is an electric vehicle, a hybrid electric vehicle, a plug-in hybrid electric vehicle or a power storage system.

* * * * *